June 5, 1923.
H. C. A. WIPP
1,457,762
FISHHOOK
Filed April 7, 1921
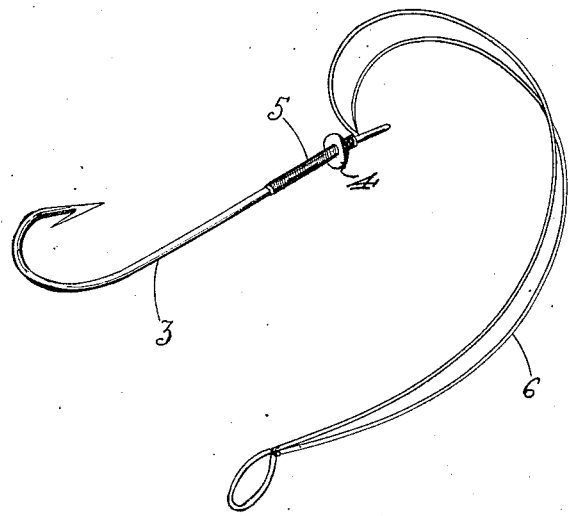
INVENTOR
HENRY C.A. WIPP
BY *E.H.Bond*
ATTORNEY Patented June 5, 1923.

1,457,762

UNITED STATES PATENT OFFICE.

HENRY CARL AUGUST WIPP, OF PORT ELGIN, ONTARIO, CANADA.

FISHHOOK.

Application filed April 7, 1921. Serial No. 459,454.

*To all whom it may concern:*

Be it known that I, HENRY C. A. WIPP, a subject of the British Empire, residing at Port Elgin, in the county of Bruce and Province of Ontario, Canada, have invented certain new and useful Improvements in Fishhooks, of which the following is a specification.

This invention relates to improvements in fish hooks and consists of the ordinary hook construction with an annular protector held on the stem of the hook.

The object of this invention is to provide a protector means on the hook so that a worm or other bait on the hook will not slide up the line while the worm is in the fish's mouth.

With these and other objects in view, the invention consists in the construction, combination and arrangement of parts as will be hereinafter fully described, illustrated in the accompanying drawings, and pointed out in the claims hereunto appended.

The drawing is a perspective view of my improved fish hook with a straight stem.

Referring to the drawings like numerals designate like parts in the various drawings.

3 indicates a hook of the ordinary construction having the bent end which end is barbed in the ordinary manner. My improvement is in the annular protector 4 which slides over the end of the hook 3 and is held on the hook by tape or thread 5 which is wound above and below the annular protector member 4. The worm is put on the hook in the ordinary manner and as it is well known to anglers the worm will very often slide up the line when the fish is fighting on the hook. With my improved construction the worm will stay on the hook and can be used over again.

The gut-line 6 is attached to the hook when the tape is being wound thereon.

From the foregoing it is thought that the construction of my invention will be clearly understood, and, therefore, a more extended explanation has been omitted.

What I claim as new is:—

The improved fish hook herein described, comprising a body portion having a barb at one end, an annular protector on the other end of said body, means wound upon said body upon opposite sides of said protector, to hold the latter in place, and a gut line affixed to the said body beyond said protector by said means, said protector serving to prevent the bait from sliding up on the line.

In testimony whereof I affix my signature in the presence of two witnesses.

HENRY CARL AUGUST WIPP.

Witnesses:
JOHN J. CHAPMAN.
J. A. CHAPMAN.